United States Patent
Masuoka et al.

(10) Patent No.: US 8,539,551 B2
(45) Date of Patent: Sep. 17, 2013

(54) TRUSTED VIRTUAL MACHINE AS A CLIENT

(75) Inventors: Ryusuke Masuoka, Potomac, MD (US); Zhexuan Song, Silver Spring, MD (US)

(73) Assignee: Fujitsu Limited, Kawasaki (JP)

( * ) Notice: Subject to any disclaimer, the term of this patent is extended or adjusted under 35 U.S.C. 154(b) by 903 days.

(21) Appl. No.: 12/326,676

(22) Filed: Dec. 2, 2008

(65) Prior Publication Data

US 2009/0172781 A1 Jul. 2, 2009

Related U.S. Application Data

(60) Provisional application No. 61/015,537, filed on Dec. 20, 2007.

(51) Int. Cl.
*G06F 7/04* (2006.01)
*G06F 9/445* (2006.01)

(52) U.S. Cl.
USPC ......... 726/3; 726/2; 726/9; 717/174; 717/176

(58) Field of Classification Search
USPC .................. 726/2, 3; 709/203; 717/174–178
See application file for complete search history.

(56) References Cited

U.S. PATENT DOCUMENTS

| | | | | |
|---|---|---|---|---|
| 6,075,862 | A * | 6/2000 | Yoshida et al. | 380/28 |
| 6,446,254 | B1 * | 9/2002 | Chapman et al. | 717/116 |
| 6,691,232 | B1 * | 2/2004 | Wood et al. | 726/6 |
| 7,823,023 | B2 * | 10/2010 | Kwan et al. | 714/38.1 |
| 7,954,150 | B2 * | 5/2011 | Croft et al. | 726/21 |
| 8,006,281 | B2 * | 8/2011 | Schackow et al. | 726/1 |
| 8,374,320 | B2 | 2/2013 | Suzuki et al. | |
| 2002/0026445 | A1 * | 2/2002 | Chica et al. | 707/100 |
| 2003/0023872 | A1 | 1/2003 | Chen et al. | |
| 2003/0145222 | A1 * | 7/2003 | Gittler et al. | 713/200 |
| 2004/0103310 | A1 * | 5/2004 | Sobel et al. | 713/201 |
| 2005/0138370 | A1 * | 6/2005 | Goud et al. | 713/164 |
| 2005/0251867 | A1 * | 11/2005 | Sastry et al. | 726/34 |
| 2006/0130060 | A1 * | 6/2006 | Anderson et al. | 718/1 |
| 2006/0161970 | A1 * | 7/2006 | Hopen et al. | 726/4 |
| 2006/0174115 | A1 * | 8/2006 | Rao et al. | 713/168 |
| 2006/0177108 | A1 * | 8/2006 | Yashiki | 382/115 |
| 2006/0179476 | A1 * | 8/2006 | Challener et al. | 726/4 |

(Continued)

FOREIGN PATENT DOCUMENTS

| | | |
|---|---|---|
| JP | 2003-076585 | 3/2003 |
| JP | 2006-221649 | 8/2006 |

(Continued)

OTHER PUBLICATIONS

English Translation of Japanese Office Action mailed Jan. 29, 2013 in corresponding JP Patent Application No. 2008-323569 (2 pages).

*Primary Examiner* — Linglan Edwards
(74) *Attorney, Agent, or Firm* — Staas & Halsey LLP

(57) ABSTRACT

The embodiments provide generating a dedicated virtual machine image (DVMI) including functionality for a target service provider and launching the DVMI in the host device as a dedicated virtual machine (DVM). A measurement of the DVMI and/or the launched DVM, as a Trusted Dedicated Virtual Machine (TDVM), is transmitted to the target service provider server. The target service provider determines a trust level for the TDVM, based upon the measurement and provides a level of service by the target service provider server to the TDVM, according to the trust level of the TDVM.

18 Claims, 12 Drawing Sheets

(56) References Cited

U.S. PATENT DOCUMENTS

| | | |
|---|---|---|
| 2006/0184937 A1 | 8/2006 | Abels |
| 2006/0190987 A1* | 8/2006 | Ohta et al. ............... 726/1 |
| 2006/0200856 A1* | 9/2006 | Salowey et al. ............ 726/5 |
| 2006/0206932 A1 | 9/2006 | Chong |
| 2007/0067590 A1 | 3/2007 | Savagaonkar et al. |
| 2007/0180493 A1* | 8/2007 | Croft et al. ............... 726/2 |
| 2007/0199058 A1 | 8/2007 | Baumgart et al. |
| 2007/0230504 A1* | 10/2007 | Smith et al. ............. 370/469 |
| 2007/0300220 A1* | 12/2007 | Seliger et al. ............ 718/1 |
| 2008/0159540 A1* | 7/2008 | Maetz et al. ............ 380/277 |
| 2009/0193074 A1* | 7/2009 | Lee ....................... 709/203 |
| 2009/0254993 A1* | 10/2009 | Leone .................... 726/25 |
| 2010/0306773 A1 | 12/2010 | Lee et al. |

FOREIGN PATENT DOCUMENTS

| | | |
|---|---|---|
| JP | 2006-260538 | 9/2006 |
| JP | 2006-338554 | 12/2006 |
| JP | 2007-066197 | 3/2007 |
| JP | 2007-213579 | 8/2007 |
| WO | WO 2005/096121 A1 | 10/2005 |

* cited by examiner

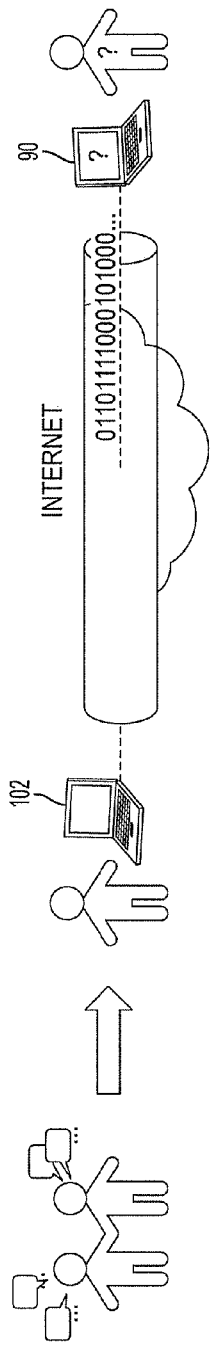

FIG. 1A

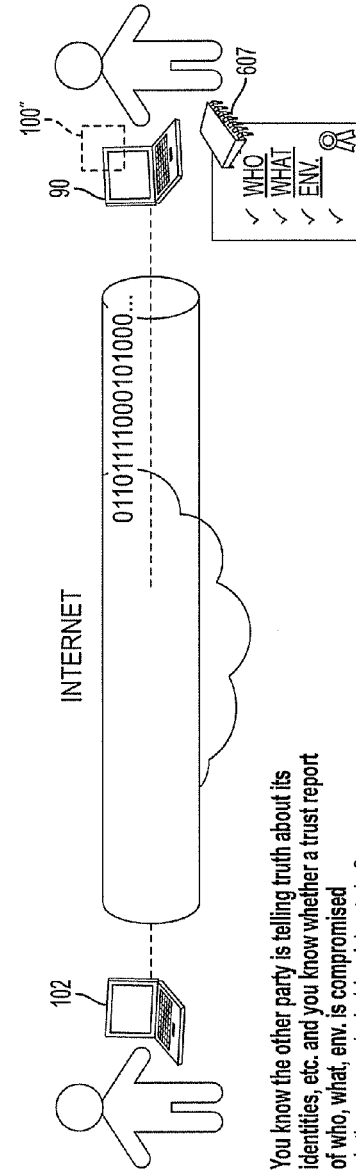

You know the other party is telling truth about its
identities, etc. and you know whether a trust report
of who, what, env. is compromised
Is the person who he/she claims to be?
Is the document generated at the time as it claims?
Is the request from computing device it claims to be?
Is the computing device running the applications as it
claims to be: Virus, malware, ... and so on

FIG. 1B

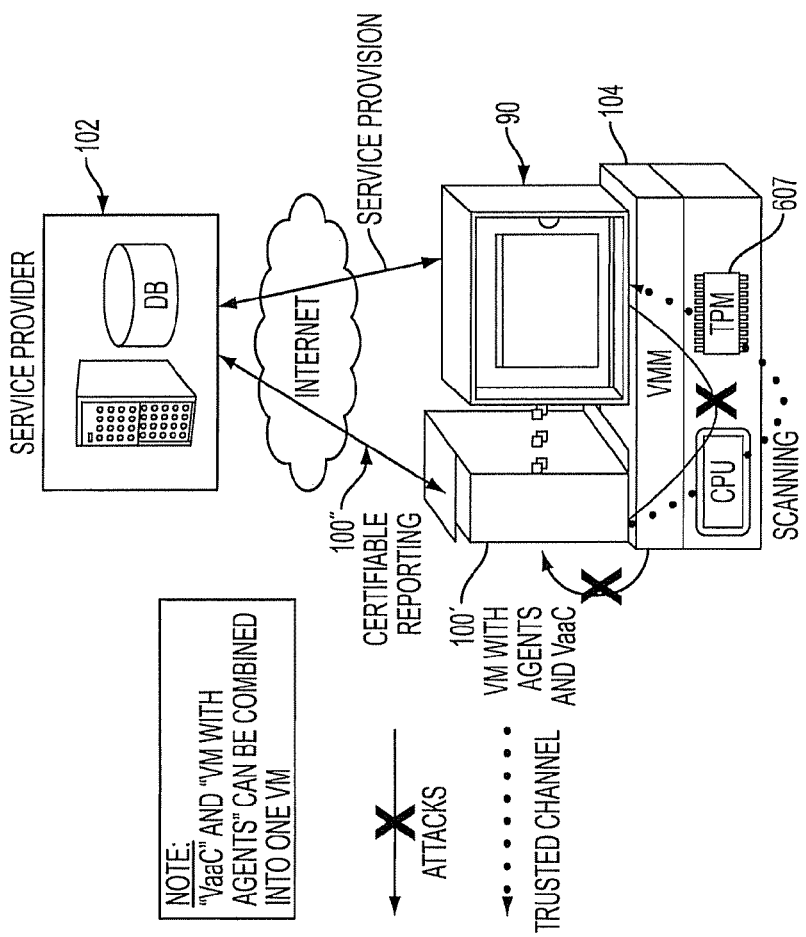

Workflow

420. Plug mBox to the host/client
421. "Program to run host verification" starts, contact "Host Measurement Collector" to get the host measurement, for example, measurement for installed software, running software, etc.
422. If verification fails, nothing will happen, STOP
423. If verification succeeds, unlock "Encrypted DVM Image"
424. "Token Requestor" requests token from server, and also the measurement of host and mBox will be collected and sent to server
425. "Policy Engine" will determine whether or not to issue a token based on the information sent from the host/client
426. If a "token" is issued, the "token" will be sent back to host/client
427. Host/client launches "virtual machine," using the DVMI in mBox above "VMM" as a trusted DVM.
428. A received token is sent to "Sensitive Information Manager" in TDVM
429. "Sensitive Information Manager" uses the token to view "Sensitive information" in server.
430. After the work is done, TDVM is closed, all changes of TDVM are discarded.
431. Unplug mBox

FIG. 4B

Workflow

520. Plug mBox to the host/client
521. "Program to run host verification" starts, contact "Host Measurement Collector" to get the host measurement, for example, measurement for installed software, running software, etc.
522. "Program to run host verification" sends the measurement to server
523. "Client verification engine" will verify whether the host is valid or not
524. If verification fails, nothing will happen, STOP
525. If verification succeeds, send "Key to decrypt DVMI" to mBox
526. Mbox uses the key to unlock "Encrypted DVMI"
527. "Token Requestor" requests token from server, and also the measurement of host and mBox will be collected and sent to server
528. "Policy Engine" will determine whether or not to issue a token based on the information sent from the host/client
529. If a "token" is issued, the "token" will be sent back to host/client
530. Host/client launches "virtual machine," using the DVMI in mBox above "VMM" as a Trusted DVM.
531. A received token is sent to "Sensitive Information Manager" in TDVM
532. "Sensitive Information Manager" uses the token to view "Sensitive information" in server.
533. After the work is done, TDVM is closed, all changes of TDVM are discarded.
534. Unplug mBox

FIG. 5B

TRUSTED VIRTUAL MACHINE AS A CLIENT

CROSS-REFERENCE TO RELATED APPLICATION(S)

This application is related to and claims priority to U.S. provisional application entitled TRUSTED VAAC (VM AS A CLIENT) having Ser. No. 61/015,537, by Ryusuke Masuoka, filed Dec. 20, 2007, which is incorporated by reference herein.

BACKGROUND

1. Field

The embodiments of the present invention relate to virtual appliances (VA).

2. Description of the Related Art

In communications over the Internet, a party really does not know who and what the party is communicating with. Securing the communication channel, such as SSL, VPN, etc. might be necessary, but not enough, because there is a need to evaluate the risk to trust the other party over the Internet.

SUMMARY

The embodiments of the present invention relate to virtual appliances (VA). For example, the embodiments provide generating a dedicated virtual machine (DVM) including only functionality targeting a single service provider, storing the DVM in a portable computing device, communicably connecting by the portable computing device to a host device, verifying the host device, and launching the DVM in the host device according to a successful result of the verifying. Upon accessing a server of the service provider through the launched DVM, the launched DVM is measured and a certifiable report of the measuring of the DVM as a Trusted Dedicated Virtual Machine (TDVM) is transmitted to the service provider server. The service provider determines a trust level for the TDVM, based upon the certifiable report and provides a level of service to the TDVM, according to the trust level of the TDVM.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1A is a diagram of an online transaction.

FIG. 1B is a diagram of Trusted VaaC certifiable reporting in an online transaction as trusted computing, according to an embodiment of the invention.

FIG. 2B is a computer system diagram of trusted computing based upon a virtual machine with measurement agents and a VaaC, according to an embodiment of the invention.

FIG. 4B is a flow chart of conducting a transaction with a service provider using Trusted VaaC mode in the computer system of FIG. 4A.

FIG. 5B is a flow chart of conducting a transaction with a service provider using Trusted VaaC mode in the computer system of FIG. 5A.

DETAILED DESCRIPTION OF THE PREFERRED EMBODIMENTS

Figure 1C:
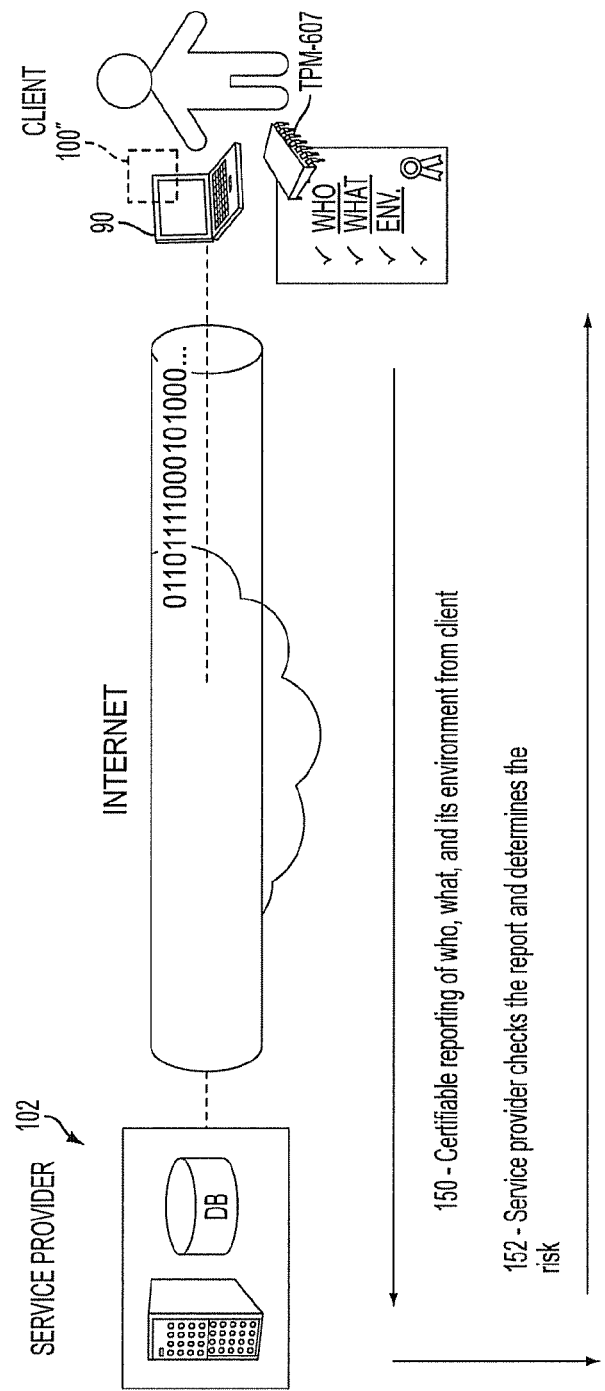
FIG. 1C is a flow diagram of Trusted Computing/Trust Cube based upon a Trusted VaaC, according to an embodiment of the invention.

FIG. 1A is a diagram of an online transaction among a service provider (server) 102 and a client 90 in which the service provider 102 does not have sufficient knowledge about the client 90 to confidently trust the client 90. The term "client" herein can refer to any combination of client computing as a client device 90 in a client-server computer system architecture as well as a person requesting access to a service provider. Similarly, the term "server" herein can refer to any combination of server computing in a client-server computer system architecture as well as an entity providing a service. Although the embodiments of the invention are described with respect to a trusted client for a service provider, the invention is not limited to such a configuration and a trusted service provider for a client can be provided.

The term Dedicated Virtual Machine image (DVM image) 100 refers to a computer file that is not yet launched (executed) of a Virtual Machine as a Client (VaaC) 100', so a launched DVM image 100 is a VaaC 100'. A Virtual Machine (VM) can be generated using any VM generator (e.g. VMWARE workstation). The DVM image 100 includes a disk image and/or a memory image. According to an aspect of an embodiment, a VaaC 100' is a virtual machine with a specific purpose (a specific function) and is also referred to herein as a Dedicated Virtual Machine—DVM 100'. For example, a VaaC 100' is dedicated by running a single application as required for providing a target service. For example, a single browser that can only connect to a single target website to provide a target service, such as without limitation, manage data (e.g., retrieve, update, add, modify, process, analyze, etc.). A Trusted VaaC (or Trusted DVM—TDVM) 100" refers to a VaaC 100' that is measured and based upon which a trust level has been established/determined, for example, by the service provider 102. The term "measurement" refers to a fixed-length digital representation of an input data sequence of any length, namely an input DVM image 100 including any VM hard disk and/or memory image, and/or files (e.g., files of software application, data files) of any computing device, and used for verifying the DVM image 100 and/or the files of the computing device, for example, by comparison against another measurement(s) previously collected to detect any changes in the DVM image 100 and/or in the files of the computing device.

According to an aspect of an embodiment, the DVM image 100 is launched by any VM launching software or Virtual Machine Monitor/Manager (VMM 104) (e.g., VMWARE PLAYER) that will map the DVM image 100 file(s) into a virtual disk on a computer and sets up a virtual machine environment (virtual CPU, virtual memory, virtual hardware, and so on) and boot the virtual machine environment using the files in the virtual disk. According to an aspect of an embodiment, since the DVM image file(s) 100 can have a very large size (several G bytes), if the DVM image 100 is on a first device, the VM launching software executing on a second device might not copy all and/or some components of the DVM image 100 into the second device for launching the DVM image 100 on the second device, but instead the VM launching software might launch and directly work on the DVM image 100 from the first device.

Previously, when a VM image was launched, any changes made in the virtual disk inside the VM caused the VM image to be different, which rendered any prior measurements of the VM image not usable for trusted computing, but requiring a re-measurement each time the VM image is used. Therefore, according to an aspect of an embodiment, the VaaC 100' is read-only by discarding any changes to the VaaC 100' after the VaaC 100' is shut down. There are several ways to achieve this read-only feature, 1) certain VMMs support this read-only function by restoring the VM images back to initial state after turning off the VMM 104, 2) controlled via the file system by, for example, before launching the DVMI 100, creating a snapshot of the DVMI 100, and after turning off the VMM 104, restore to the snapshot.

According to an aspect of an embodiment, Virtual Machine As A Client (VaaC) 100' provides virtual machine (VM) technologies at the client side to lower the complexity of measuring the client side environment so that it is feasible to build a fully trusted client which is verifiable, for example, verifiable from a server, as a Trusted VaaC 100". According to an aspect of the invention, a restricted purpose (e.g., a single purpose) read-only virtual machine (VM) is provided at the client side as a VaaC 100' to lower the complexity of measuring the client side environment so that it is feasible to build a fully trusted client which is also verifiable, for example, verifiable from a server.

According to an aspect of an embodiment, the VaaC's DVM image 100 are delivered/provided and/or transmitted to a VaaC host, for example, to a VaaC client host 90, which is in communication with a service provider server 102, according to myriad of techniques including (without limitation) by any computing device (any device having computing power) as a DVM image 100 device comprising a computing processor (CPU) and data storage (e.g., memory) that processes computer readable instructions (software). According to an aspect of an embodiment, the DVM image device can be a mobile trust box (mBox) 110 comprising a mobile (portable) housing including a CPU, any form of data storage (e.g., memory, hard disk, etc.) and/or a Trusted Platform Module (TPM). The concept of TPM is known.

According to an aspect of an embodiment, the DVM image device, for example, mBox 110, blocks a launch (release) of the DVM image 100 when the VaaC client host 90 measurement(s) are not good.

According to an aspect of an embodiment, the VaaC's DVM image 100 is encrypted and as part of (prior, during, and/or after) release of the DVM image 100, the encryption key to the encrypted DVM image 100 is made available. According to an aspect of an embodiment, the encryption key for decrypting the DVM image 100 can be provided by the DVM image device, for example, the mBox 110, by the VaaC client host 90, or via another server, or any combinations thereof.

According to an aspect of an embodiment any combinations of the described features can be provided. Further, the example embodiments are described referring to the mBox 110 as an example of a DVM image device and referring to a VaaC client host 90 as an example of a VaaC host, however, the embodiments of the invention are not limited to such a configuration, and the VaaC host can be any computing device running (executing) the VaaC 100' whether a client and/or a server, and the DVM image device can be any computing device, mobile or not-mobile or stationary (as the case may be), on which the VaaC DVM image 100 is stored and/or secured.

FIG. 1B is a diagram of Trusted VaaC certifiable reporting in an online transaction as trusted computing, according to an embodiment of the invention. In FIG. 1B, a Trusted VaaC 100" in a client device 90, is a measured specific-purpose Virtual Appliance (VA) used as a client for SaaS (Software as a Service) and other online services in a trusted environment. An important aspect of this is that a measured VaaC 100' as a Trusted VaaC 100" can be "trusted" by a service provider 102 through certifiable or trusted reporting of who, what, and its environment. This trust certifiable reporting can be enabled by TrustCube (who, what and/or computing environment) infrastructure, a FUJITSU concept for Trusted Computing environment combined with hardware-protected authentication, for example, hardware-protected biometric authentication. Certifiable reporting refers to a summary of trust information useable for establishing a chain of trust according to application criteria. Trust information relating to who, what and/or computing environment can include any combination of user information (e.g., password, user ID, etc.), signatures, and computing environment measurements (e.g., Trusted VaaC 100", host 90 measurements, TPM related data and/or measurement), encryption related information (keys), and chain of trust information. Thus, according to an aspect of an embodiment, a certifiable report including measurements of the VaaC 100' is sent to the service provider 102 to certify the report by verifying a chain of trust is correct and compare the measurements of the VaaC 100' with pre-stored measurements to authorize a VaaC 100' as a Trusted VaaC 100".

FIG. 1C is a flow diagram of Trusted Computing/Trust Cube based upon a Trusted VaaC, according to an embodiment of the invention. In FIG. 1C, at 150, the Trusted VaaC 100" provides a certifiable report of who, what, and its environment to the service provider 102. At 152, the service provider checks the report from the Trusted VaaC 100" and determines the risk. At 154, the service provider 102 provides a service based on the risk evaluation in 152. The basic idea of TrustCube or Trusted Computing is easy to understand when one thinks of a dedicated terminal for a specific service, for example, ATM (Automatic Teller Machine) for banking, a special terminal dedicated for military application, etc. Such dedicated terminals are simply devices that have the capability to access remote services over a network. But one is much more comfortable doing transactions at an ATM than online (e.g., Internet) banking, or accessing military data from a specially secured location for military applications. In case of a bank, when the bank, as a service provider, "KNOWS" exactly which machine is accessing the bank as the service provider, what kind of hardware/software configuration the machine has, and the machine is physically tamper-resistant (so that the configuration cannot, at least not easily, be changed), it is easy to imagine that the bank would have more confidence in the validity of transactions. Likewise, under similar circumstances, a military would have more confidence that remote data access requests are valid. In case of ATMs with biometric sensors (for example, many ATMs in Japan are now equipped with palm vein sensors), the bank "KNOWS" that biometric sensor is securely configured in a physically tamper-resistant enclosure so that the biometric recognition result is not tampered with.

Therefore, if such a dedicated terminal can be provided for each online service, the service provider can comfortably allow its customers do transactions or access sensitive data even in the current hostile environment for online services with threats like viruses, malware, and botnets rampant. But it is going to be prohibitively expensive and impractical to provide such a dedicated terminal for each person, and it is unlikely to happen.

At the core of the dedicated terminal solution, it is the knowledge of terminal's identity, terminal's hardware/software configuration, and its user's identity, and the service provider is sure that the device cannot be easily tampered with.

If the service provider can obtain such knowledge as solid as that of their own dedicated terminal, it will change the whole online service landscape. Trusted Computing and TrustCube have been proposed to provide certifiable reporting of who, what, and environment of the client to the service provider for such knowledge to be available for the service provider. The certifiable reporting based on hardware alone, such as only TPM (Trusted Platform Module), from the client device to the service provider cannot be compromised (at the minimum it is detectable if compromised). Thus the service provider can have a high-level of confidence in the knowledge of client terminals through this certifiable reporting.

But it is not an easy task to implement certifiable reporting based upon "trust" state of only software and/or data or in combination with hardware, especially with a modern bloated OS. Software based certifiable reporting is difficult because:

(1) protecting applications as well as protecting the measuring and reporting agents within the OS is nearly impossible, (2) measuring the system is time consuming and size of report could be rather huge, and (3) connecting the biometric sensor securely to the reporting agent and protecting privacy (users' biometric data) are not easy Trusted Computing had fallen short of fulfilling its promise due to those obstacles. As for (1), many applications with different security requirements co-exist in a single OS. If the OS is made very restrictive for an application demanding strong protection, it would render the OS unusable for other applications and purposes. In order to guarantee certifiable reporting to the service provider, the whole OS and applications on it need to be uncompromised without vulnerability. But it would be a very difficult task. If measuring and reporting agents themselves need to run within such an OS and to report from the OS, it will be an enormous task for the service provider to determine the trustworthiness of the report even if it managed to know all the components on the client (there can also be problems/vulnerability caused by particular combinations of components).

Item (2) is an important issue to make the Trusted Computing and certifiable reporting practical. For example, you can easily have a couple of hundreds of thousands of files (total size in tens of GBs) on WINDOWS VISTA. When one thinks of experimental facts that it takes 6 seconds to scan about 1,000 files (total size of 120 MB) and the report size is 138 KB on current laptop PCs, it is easy to imagine the impact on the usability, practicality, and load on the client and network. It would also create a large burden on the service provider side, which needs to deal with huge reports from many clients.

In view of (3), biometric sensors need to be connected securely to the reporting agent and/or the hardware (such as TPM) that the reporting agent relies on. Only then, certifiable reporting of "who" is possible. But it is very difficult to protect the path in a modern bloated OS from biometric sensors to the reporting agent and/or its dependent hardware. It is also critical for privacy concerns to keep the users' biometric data local and not exposed externally.

Figure 2A:
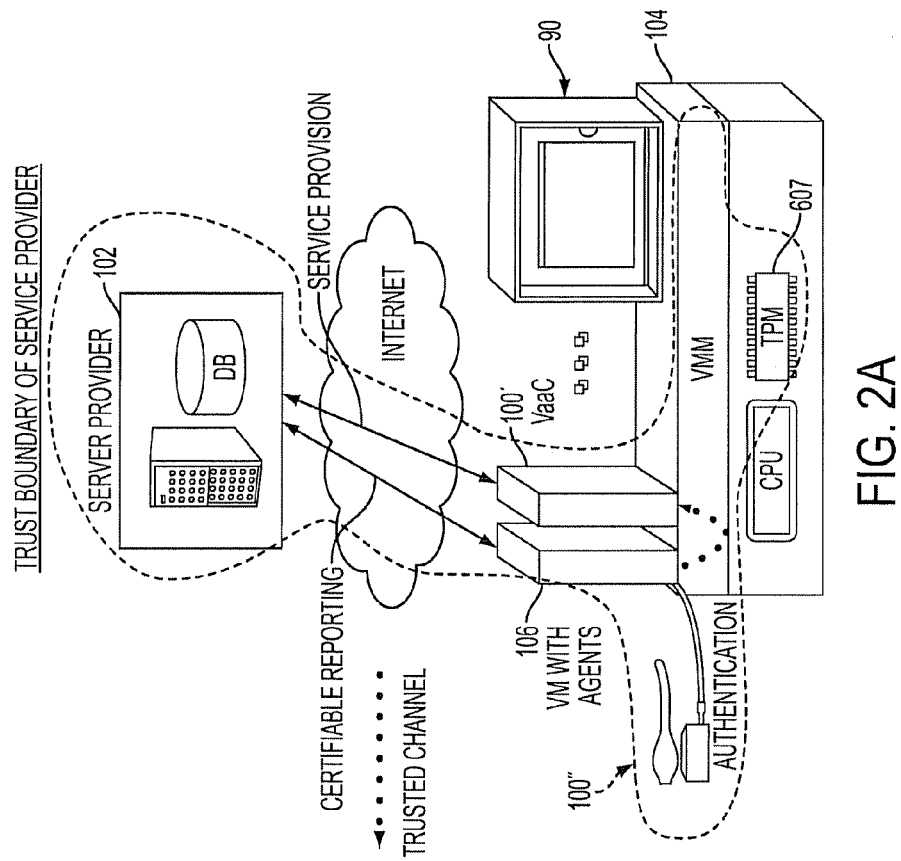
FIG. 2A is a computer system diagram of trusted computing based upon a virtual machine including measurement agents and a VaaC, according to an embodiment of the invention.
Figure 2C:
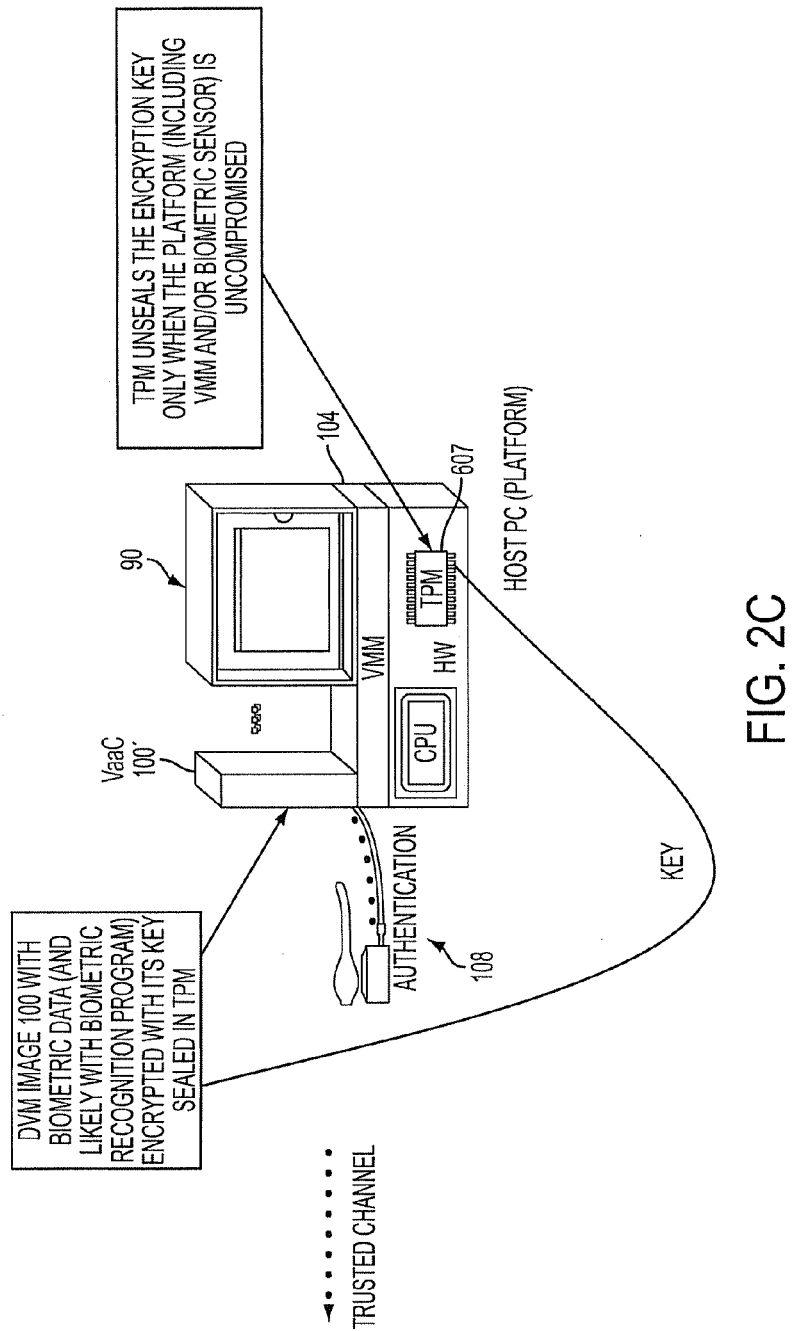
FIG. 2C is a computer system diagram of a Virtual Machine (VM) image with biometric data sealed by a Trusted Platform Module (TPM), according to an embodiment of the invention.

FIG. 2A is a computer system diagram of trusted computing based upon a virtual machine including measurement agents and a VaaC, according to an embodiment of the invention. In order to circumvent those problems, virtual machine technology has been employed in trusted computing. Virtual Machine Monitor (VMM or hypervisor) 104 can isolate virtual machines (VMs) as VaaCs 100' running on the VMM 104 from each other and can give appropriate protections for VMs running on top of it. In trusted computing, a strategy is to measure the VMM 104 and its VaaC(s) 100' with measuring and reporting agent(s) and use certifiable reporting to report those measurements from those VaaC's 100' to the service provider 102. The service provider 102 "KNOWS" for sure that the VMM 104 and the VaaC 100' are not compromised (or detects the compromise if any). In FIGS. 2A-2C, a trusted channel is provided for inter VM communication, for example, the trusted channel can be established by the VMM 104, namely between the VM with agents 106 and the VaaC 100'.

FIG. 2B is a computer system diagram of trusted computing based upon a virtual machine with measurement agents and a VaaC, according to an embodiment of the invention. In FIG. 2B, the measuring and reporting agents can run on a VaaC 100' itself or on a separate VM 106. Regardless, the service provider 102 knows that the VM 100', 106 (as the case may be) running the measuring and reporting agents are not compromised and protected from other VM and the VMM. VaaC 100' can run a general-purpose OS, such as WINDOWS, side-by-side the VM 106 running the agents and those agents can measure the general-purpose OS and send the certifiable reports to the service provider 102. Previously, virtual machine technology has been combined with trusted computing to partially solve (1) by running measuring and reporting agent in another VM. But it does not solve all the problems (1)-(3) listed above and it requires introduction of Trusted VaaC 100" to solve them. Since the VMM 104 is executing at the host/client 90, untrusted VM, such as MICROSOFT WINDOWS, as well as trusted VMs, such as the Trusted VaaC 100", can be executing on the host PC 90, so one attack example is: the untrusted VM, such as WINDOWS, sends a command through VMM 104 to modify the content in VaaC 100' and/or VM with agent 106 to manipulate the reporting procedure and/or obtain services from the service provider 102.

In FIGS. 2A and 2B, according to an aspect of an embodiment, a stripped-down OS and application with specific purpose(s), for example, a single purpose, is used in a trusted VM as a client (Trusted VaaC) 100" for a service. A measured VaaC 100' with the stripped down OS and limited purpose client applications is referred to herein as a Trusted VaaC 100".

Because in the VaaC 100', the number of files and total size of all the files are small, the measuring can be done very quickly and the report size will be much smaller. Therefore specific-purpose OS/application in a VaaC 100' solves the problem of (2). In case where a few files are used for virtual hard disk images and virtual memory images (instead of individual files in hard disk partitions), the measuring time and report size will be significantly reduced, making certifiable reporting much more practical. The use of a trusted virtual specific-purpose OS/application on a client (i.e., Trusted VaaC 100") makes it easier for the service provider to verify the report. According to an aspect of an embodiment, the Trusted VaaC 100" can be read-only, such that as a virtual limited-purpose OS/application is used, the same files and/or memory images (either they are separate files or virtual hard disk images) can be used again and again by discarding the changes made for files and/or memory images after the Trusted VaaC 100" is used. That will make checking of the reporting by the service provider 102, a much easier task.

The introduction of virtual machine technology makes the idea of Trusted VaaC in any computing environment practical. Distributing a dedicated real hardware terminal to each user would be too costly and impractical. Isolation by VMM 104 can be leveraged to run the Trusted VaaC 100" next to general-purpose OSs. A user usually can work with everyday applications on a general-purpose OS such as WINDOWS. Only when the user needs to do financial transactions or access sensitive data, the user can switch to the Trusted VaaC 100". Putting or providing a trusted virtual single dedicated device via the Trusted VaaC 100" into a multipurpose environment makes the solution cost-efficient. When switched to Trusted VaaC 100", a mode can be referred to as Trusted VaaC mode.

According to an aspect of an embodiment, much less functions are provided in a Trusted VaaC 100", leading to a smaller number and total size of files, states, and other components to be measured for a Trusted VaaC 100", because functions unnecessary for its specific purpose are dropped. For a general-purpose OS, it is very difficult to drop its functions to increase measurement efficiency, because it is exactly the point for a general-purpose OS to have as many functions as possible to accommodate many different kinds of applications.

It is also very important to note that according to an aspect of an embodiment, the Trusted VaaC 100" is read-only. In other words, any changes to the Trusted VaaC 100" are discarded after every (each) use of the Trusted VaaC 100", including virtual hard disk drive images and virtual memory images. This is because of its specificity of its purpose and all the requirements can be incorporated into the initial configuration. It requires no or very few changes similar to a dedicated terminal and appliance. In contrast, a general-purpose OS cannot have such a luxury, for example, it cannot have control over its states (especially files) due to its necessity to accommodate many different applications. Even a Web browser on a general-purpose OS requires rewriting of files for its history, bookmarks, cookies, cache, etc. Even if a Trusted VaaC 100" uses a Web browser for its specific purpose, it does not require such rewriting as the site it should access is fixed.

This feature (that a Trusted VaaC 100 can drop the changes) leads to a very important advantage of Trusted VaaC 100. A Trusted VaaC 100 as a VM can use few files for its virtual hard disk drives and/or its memory. Those few files can be fixed for its life-time and placed flat in a single directory or a very simple directory structure. Instead of measuring huge number of changing files in a complex directory structure, a measuring agent for the Trusted VaaC 100" measures a few fixed files in a flat or simple directory structure. The smaller total size of the files also leads to the faster measurement. The measurement should be done very quickly with almost no penalty beyond the sequential read of those few files since measurement algorithms, such as a Secure Hash Algorithm (SHA) (e.g., SHA1) is very light-weight.

One example benefit of Trusted VaaC 100" versus a dedicated terminal, is the CPUs for PCs, which should be the major target platforms on which Trusted VaaC 100" would run, are much faster than those CPUs of dedicated terminals and appliances. The measurement would be done in a substantially short period of time and the resulting measurement report should be significantly smaller. It would also reduce the load and complexity of the system for the service provider to check fixed measurements from smaller reports and to determine the course of action with the client.

A Trusted VaaC 100" should generally require much less effort for its runtime measurements too, because less components change during its runtime due to its purpose specificity.

FIG. 2C is a computer system diagram of a Dedicated Virtual Machine (DVM) image with biometric data sealed by a Trusted Platform Module (TPM). In FIG. 2C, biometric sensor(s) can be connected to the reporting agent through VMM 104 and a VM (this may be the VaaC 100' or another VM 106). In FIG. 2C, the DVM image 100 for launching the VaaC 100' including user's biometric data (and very likely a biometric recognition program) can be encrypted with the encryption key sealed in the TPM 607. Unless the platform (including VMM 104 and/or biometric sensor) is confirmed uncompromised by the TPM 607 (ex. the platform is not changed from the last time), the encryption key would not be unsealed, thus strongly protecting the user's biometric data and privacy. In particular, during the booting time, snapshots of the platform 90 (including VMM 104 and/or biometric sensor 108) are generated and "extended" to certain TPM Platform Configuration Registers (PCRs). These TPM PCR values should always be the same as long as the VMM 104 and/or biometric sensor 108 are not modified. The encryption key can also be sealed by "known" correct PCR values. If for some reason the correct value cannot be generated, the key will not be correctly decrypted. Here, the terms "extend", "seal" and "PCR" are known concepts in Trusted Computing. Another way is to keep only the user's biometric data encrypted by TPM-sealed key, and while in this case the path from biometric sensors to the reporting agent might not be completely protected, the important thing is that service provider 102 is able to efficiently estimate how protected those VMM 104 and DVM image 100 are through the certifiable reporting, thus to evaluate how trustworthy the biometric recognition result is. This addresses the problem (3), because a core idea is that the trust boundary of the service provider 102 can be extended over the network to include Trusted VaaC 100" and even include biometric sensors. This will provide the service provider 102 the same level of confidence as dedicated terminals to allow the customer to do transactions or access sensitive data.

Figure 2D:
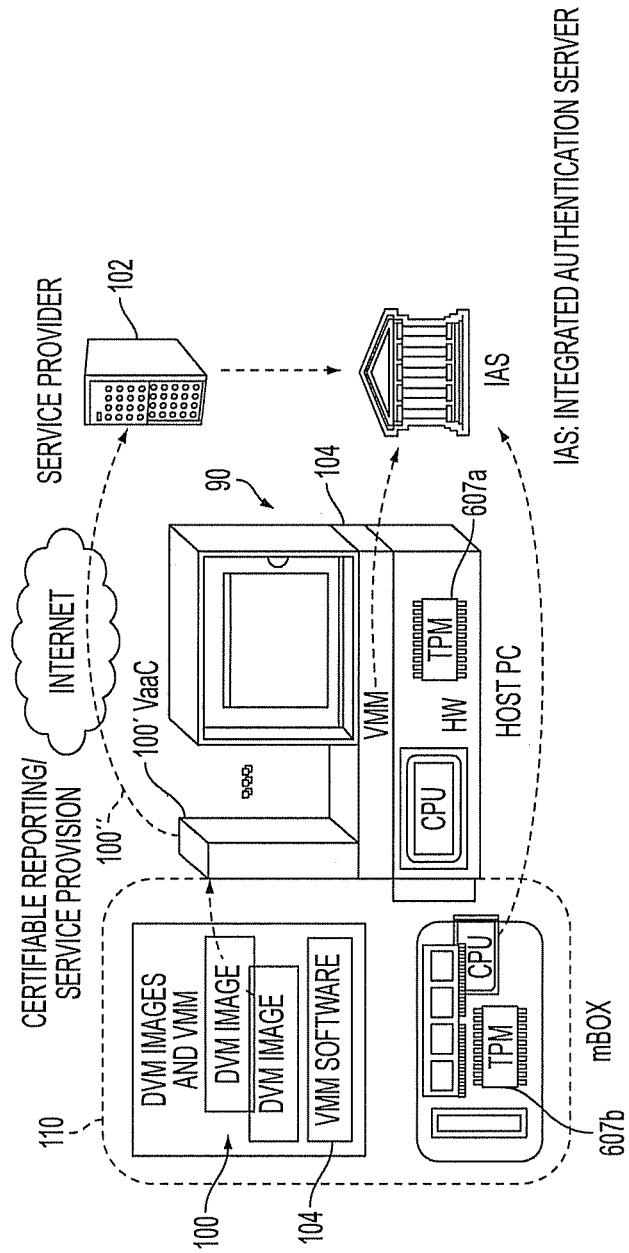
FIG. 2D is a computer system diagram of a DVM image launched with an mBox, according to an embodiment of the invention.

FIG. 2D is a computer system diagram of a DVM image 100 launched with an mbox. According to another aspect of an embodiment, the VaaC is combined with mBox 110. For example, mBox 110 is a USB device, which provides DVM images 100 (and potentially VMM software 104) to a host PC 90 after checking the integrity of the host PC 90, on which the DVM images 100 run as a Vaac 100' and eventual running as a Trusted VaaC 100". Because the Trusted VaaC 100" is small, less storage space is needed to hold the DVM images 100 thereof (or more DVM images 100 thereof in the same storage space can be stored) in mBox 110. Or if the DVM image 100 is delivered through the network, the delivery can be in less time and/or bandwidth. In FIG. 2D, the mbox 110 can include a TPM 607*b* in relation to the TPM 607*a* of the host/client 90 for securing keys to decrypt the DVM images 100 and/or the VMM software 104 stored thereon and/or for confirming integrity of these data in the mBox 110. According to an aspect of an embodiment, the VMM software 104 is installed in the host PC 90 from the mBox 110, and the VMM software 104 is measured before installation and execution in the host/client 90.

Features of the Embodiments of the Invention:

1. Generate a virtualized machine including fixed OS, applications, Web browsers, or only those OS, applications or Web browsers necessary for limited purposes, and for each unnecessary functionality dropped. According to an aspect of an embodiment, OS can be eliminated with an application directly using virtual computer functionality (e.g., running directly on top of a virtual CPU), for example, in case of virtual embedded devices. Further, the virtualization can be hardware agnostic by using a VMM 104. Other examples include:

a. Eliminate or substantially reduce file system usage by using a memory image and/or a file system image of the necessary files to transact with the service provider.

b. Accessories for OS, add-ins for applications and Web browsers, and tab interface for Web browser can be dropped. The term "accessories" refers to software tools, namely any optional software not required for operation of the OS to interface with the target service provider.

c. Limit access to certificate stores of OS, applications, and/or Web browsers. A certificate store can be a storage area in OS where all user/system certificates are placed.

d. Unnecessary peripherals can be dropped, examples include floppy disk, USB controller, CD/DVD drive, output devices like display, sound device, printer, input devices like keyboard, mouse, even NIC (network interface card) for some applications.

2. Apply high or highest protection-level settings for OS, applications, and/or Web browser. According to an aspect of an embodiment, OS defined or other multiple security level settings are managed to provide a target protection level for achieving desired trust level based upon controlling user authority within the DVM 100', which can be from highest to high, medium, low, and lowest. Higher security level refers to more restrictions on users and less user customization (e.g., less authority to change settings, manage accounts, manage software (install, update, delete, edit), access data, etc.). According to an aspect of an embodiment, a target protection-level is high or highest, while by default the protection level is medium.

3. Restriction on IP addresses or Domain Name System (DNS) names that the VM can access. According to an aspect of an embodiment, a number of IP addresses or DNS names are limited to a target service provider server. For example, the restrictions on IP addresses and/or DNS names would be unrealistic for a general-purpose OS, but they are quite reasonable for a Trusted VaaC, which has no other applications to worry about and requires one or few servers to connect to. The latter restriction can prevent cross-site scripting for Web browser and other threats, for example.

These restrictions can be applied at one or multiple levels of VM, OS, and applications. For example, printing can be restricted by the Trusted VaaC 100", thus not exposing printer devices to the OS, removing OS's printing functions, or removing application's printing functions. There can be many other restrictions possible. But the most important aspect of all is that the service provider 102 can KNOW that those restrictions and configurations are in place and unchanged through certifiable reporting from the Trusted VaaC 100".

Other Features of the Trusted Vaac 100" are:

4. Can discard changes made to the Trusted VaaC's 100" file system (and memory) images after each use of Trusted VaaC (i.e., a read-only Trusted VaaC 100").

5. Can run with a general-purpose OS (in and/or outside VM) side-by-side and still protected.

6. Can use dedicated client software or generic applications (such as Web browser) tuned and customized for the specific SaaS or online application.

Merits of Trusted VaaC Can be as Follows:

Many merits of Trusted VaaC 100" are similar to those of dedicated terminals and virtual appliances (VAs), but some are derived from the particular combination of Trusted Computing/TrustCube and Virtual Machine technology. Some example merits are based upon the restrictions one can apply to a Trusted VaaC 100". According to an aspect of an embodiment, features that make Trusted VaaC 100" small and less complex with more control over its environment for service provider 102, lead to the following example Trusted VaaC 100" merits.

1. Less vulnerabilities.

2. Easy to develop the client or Web application as its environment can be fixed.

3 Less tests necessary for client development and deployment.

4. Faster to boot the Trusted VaaC 100", or to start it from a saved state.

5. Cost-effective (can use generic PCs and no need for special and/or dedicated terminal hardware).

6. Trusted VaaC 100" can be easily delivered, because smaller memory (leading to less cost) can be used in case of mBox or mBox can fit in the same store space more DVM images 100 for establishing one or more respective Trusted VaaC 100", or less time and/or bandwidth required to deliver DVM images 100 over the network.

But more importantly, Trusted VaaC makes Trusted Computing and TrustCube practical through the following:

7. Faster to measure the system, namely the VaaC 100', because it is small and less complex. Especially if a few files are used for virtual hard disk images (instead of individual files in hard disk partitions) and/or for virtual memory images, the measuring time and report size will be significantly reduced.

8. Measurement reports will be smaller, requiring less time and bandwidth to send them.

9. Smaller report and/or fixed measurements alleviate burden of checking the report and determining the actions for the client by the service provider.

Figure 3:
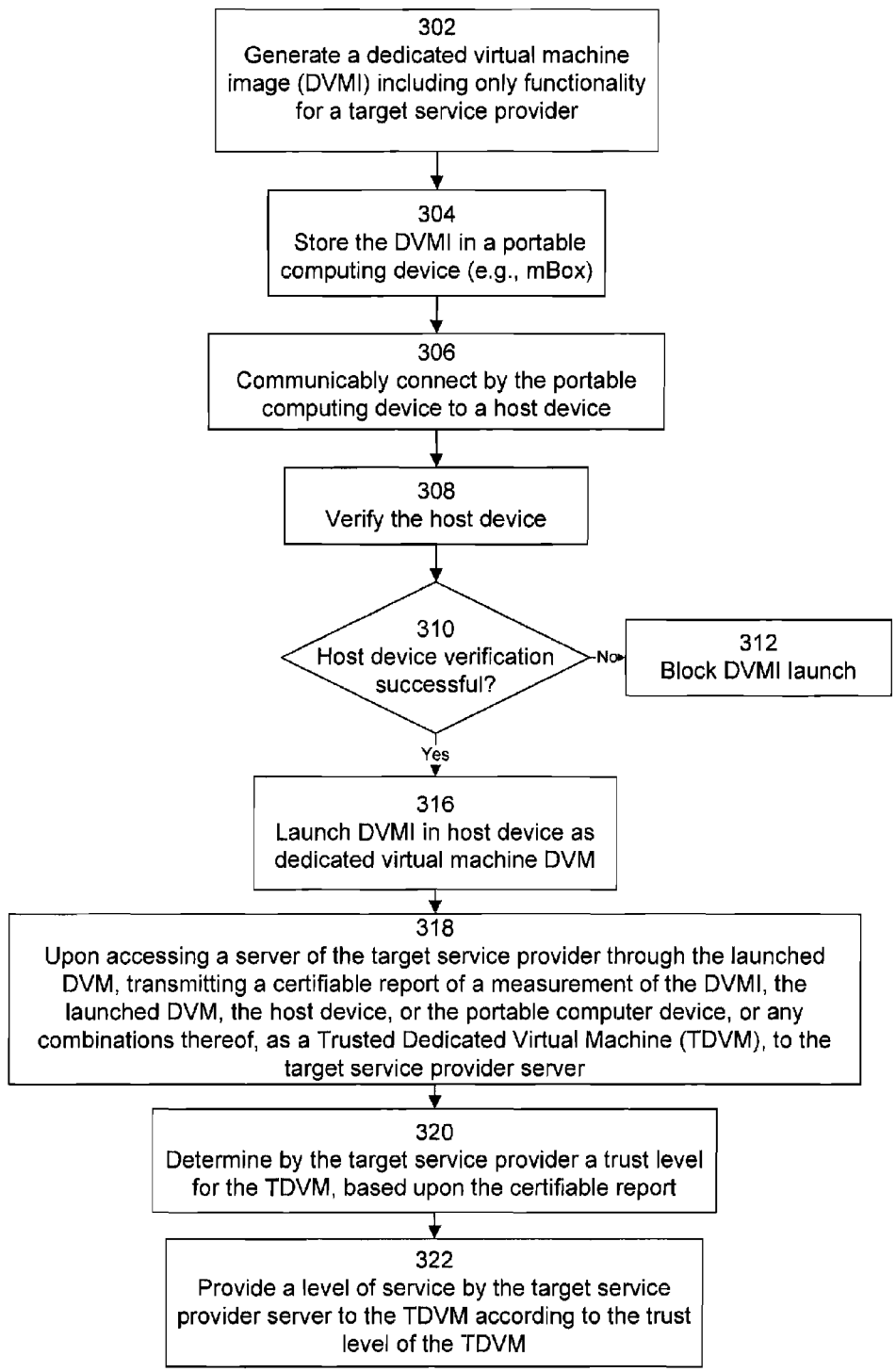
FIG. 3 is a flow chart of conducting a transaction with a service provider using Trusted VaaC mode, according to an embodiment.

FIG. 3 is a flow chart of conducting a transaction with a service provider using Trusted VaaC mode, according to an embodiment. In FIG. 3, at 302, a dedicated virtual machine image (DVMI) 100 including only functionality for a single target service provider 102 is generated. However, the embodiments are not limited to a single target service provider, and the DVMI 100 could include functionality for a plurality of target service providers 102. For example, at operation 302 the following operations can be performed, namely, (1) identify a client side software that is required to perform a target task (e.g., virtual private network (VPN), MS WORD, Web browser, etc.), (2) generate a virtual machine, (3) install the required software for the target task and uninstall unnecessary items for performing the target task, for example, unrelated OS components, (4) create a regular user and assign only limited authority limiting user to OS functionality and use of the client side software required to perform the target task (e.g., cannot update software, cannot modify registry, cannot browse system folders, etc.), and (5)

release the virtual machine image as the DVMI 100. When the DVMI 100 is launched a Dedicated Virtual Machine (DVM) 100' is established or provided. Thus, an example of a DVM 100' can be a virtual machine environment in which the only installed software is a Web browser and the Web browser can only visit one web server which hosts a company's sensitive documents. Any attempts to visit web sites other the target web site will be rejected. Further, the user cannot install/remove other software in the DVM 100'.

At 304, the DVMI 100 is stored in a portable computing device, for example, the mBox 110. According to an aspect of an embodiment, the DVMI 100 is encrypted with a key and then stored in the mBox 110. According to an aspect of an embodiment, a VMM 104 is also stored in the portable computing device. According to another aspect of an embodiment, the mBox 110 includes a TPM 607b protecting the key and/or the key can be retrieved from another entity, for example, an Integrated Authentication Server (IAS).

At 306, the portable computing device communicably connects to a host device 90, also referred to as a client. At 308, the host device 90 is verified. If at 310, the host device 90 verification is successful, at 316, the DVMI 100 is launched in the host device 90 as a Dedicated Virtual Machine (DVM) or VaaC 100'. According to an aspect of an embodiment, the launching of the DVMI 100 includes launching both the DVMI 100 and a VMM 104. If, at 310, the host device 90 verification is not successful or fails, at 312, DVMI 100 launch is blocked.

At 318, upon accessing a server of the service provider 102 through the DVM 100' (i.e., through VaaC 100'), the DVM 100' is measured for establishing a Trusted DVM (TDVM) 100" and a certifiable report of the measuring of the DVM 100' is transmitted to the service provider server 102. At 320, the service provider 102 determines a trust level for the TDVM 100" for establishing or recognizing the Trusted DVM 100", based upon the certifiable report; and at 322, a level of service is provided by the service provider server 102 to the TDVM 100", according to the trust level of the TDVM 100".

Figure 4A:
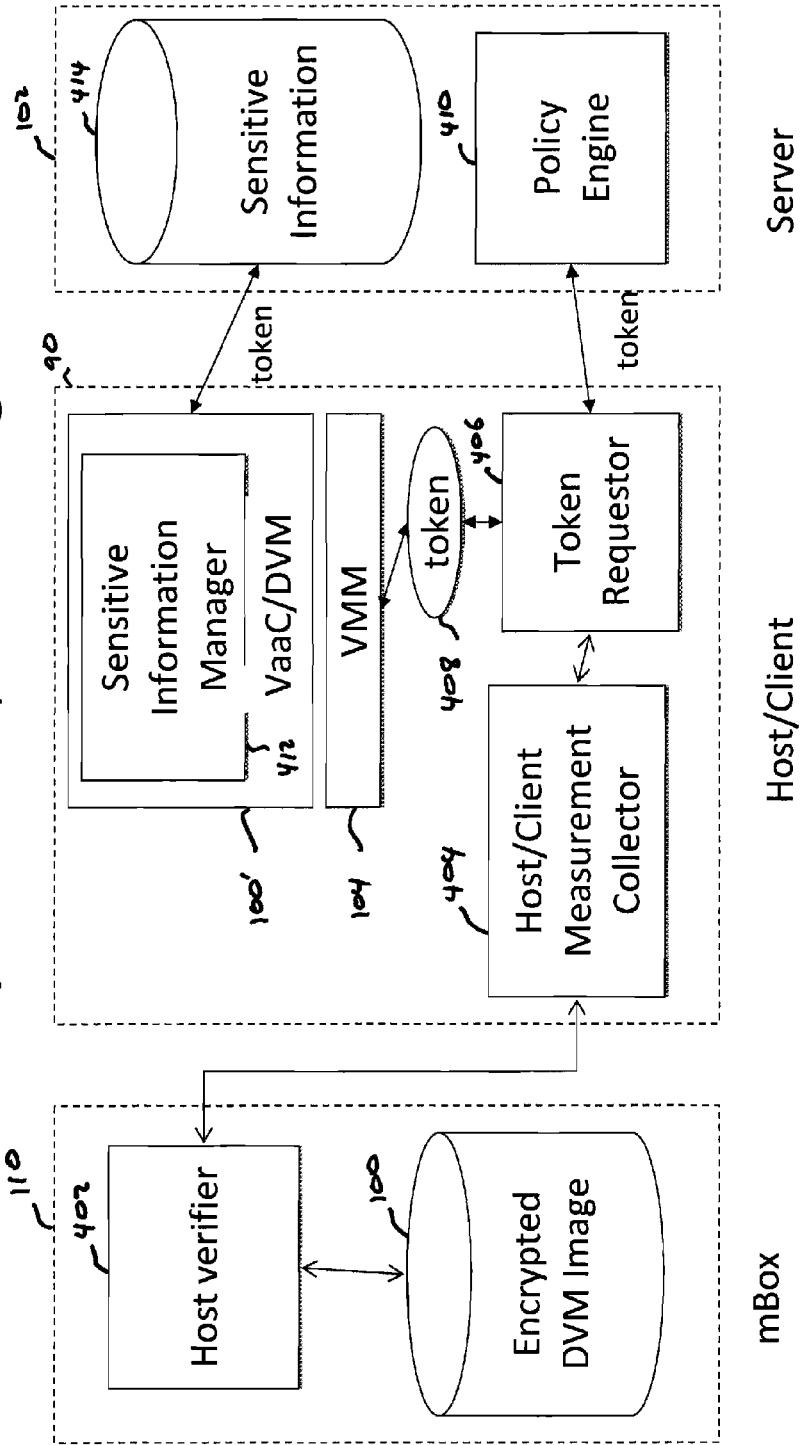
FIG. 4A is a functional block diagram of a computer system conducting a transaction with a service provider using Trusted VaaC mode, according to an embodiment.

FIG. 4A is a functional block diagram of a computer system conducting a transaction with a service provider using Trusted VaaC mode, according to an embodiment. In FIG. 4A, an mBox 110, a Host/Client 90 and a server 102 are in wire and/or wireless data communication. Further, according to an aspect of an embodiment, the term transmission of information among the mBox 110, the host/client 90 and the server 102 is not limited to computer network data communication, but other forms of communication can be used, such as telephone, fax, email, codes (e.g., barcodes), etc. The mBox 110, the host/client 90 and the server 102 are computers storing programs (software) and/or computing hardware that control the computer to execute operations according to the invention. In FIG. 4A, the mBox 110 includes a host verifier 402 (e.g., a program running host verification). Further, the mBox 110 includes an encrypted dedicated DVM image (DVMI) 100. The host/client 90 includes an installed (executing or launched) VaaC/DVM 100', a VMM 104, a host measurement collector 404, and a token requester 406. A server of the service provider 102 includes sensitive information 414 and a policy engine/rules 410.

FIG. 4B is a flow chart of conducting a transaction with a service provider using Trusted VaaC mode in the computer system of FIG. 4A. In FIG. 4B, in case the mBox 110 is communicably connectable to the host/client 90 via a Universal Serial Port (USB), at 420, the mBox 110 is plugged to the host/client 90. At 421, host verifier 402, namely a "Program to run host verification," starts, and contacts Host Measurement Collector 404 to get the host measurement (i.e., installed software, running software, etc.). At 422, if host/client 90 verification fails, nothing will happen or the process is stopped. At 423, if host/client 90 verification succeeds, the host verifier 404 unlocks the DVMI 100. At 424, token requester 406 requests token 408 from server 102, and also at this time the measurement of both the host/client 90 and mBox 110 will be collected by the host measurement collector 404 and sent to server 102 (i.e., a token request including a host/client 90 and/or mBox 110 measurement are sent to the policy engine 410 of the server 102). At 425, the policy engine 410 will determine whether to issue a token based on the measurement information sent from the host/client 90. At 426, if a token 408 is issued, the token 408 will be sent back to host/client 90, thereby establishing a Trusted VaaC/Trusted DVM 100". At 427, the host/client 90 launches the Trusted VaaC/TDVM 100" above VMM 104 using the DVMI 100 in mBox 110. At 427, the VMM 104 is running or executing on the host/client 90, and the VMM 104 provides an interface to launch a new VM, namely the DVM 100'. In particular, at 427, after the host/client measurement collector 404 collects the measurements and the measurements have been verified, the measurement collector 404 uses the VMM 104 interface to launch the DVM 100' as a TDVM 100" based upon the DVMI 100.

According to an aspect of an embodiment, at 318, the verifying of the host/client 90 comprises upon accessing a server 102 of the target service provider through a launched DVM 100', transmitting a certifiable report of a measurement of the DVMI 100, the launched DVM 100', the host/client 90, or the mBox 100, or any combinations thereof, as a Trusted Dedicated Virtual Machine (TDVM), to the target service provider server 102. According to an aspect of an embodiment, the controlling of launching and/or operation of the DVMI by the host device as a trusted read-only dedicated virtual machine (TRODVM), is based upon a trust level designation received from the service provider server based upon the verifying of the host device and/or the mBox 110. According to an aspect of an embodiment, the mBox 110 controls launching of the DVMI 100 in the host/client 90, for example, by transmitting the DVMI 100 launch parameters from the mBox 110 to the host/client 90.

At 428, the token 408 is sent to a Sensitive Information manager 412 in TDVM 100". At 429, the Sensitive Information Viewer 412 uses the token 408 to access (e.g., manage, view, retrieve, edit, etc.) sensitive information 414 in server 102. Sensitive information can be any information desired to be protected according to any application criteria. At 430, after the work (transaction with service provider 102) is done, TDVM 100" is closed, all changes of TDVM 100" are discarded, and at 431, the mBox 110 can be unplugged.

Figure 5A:
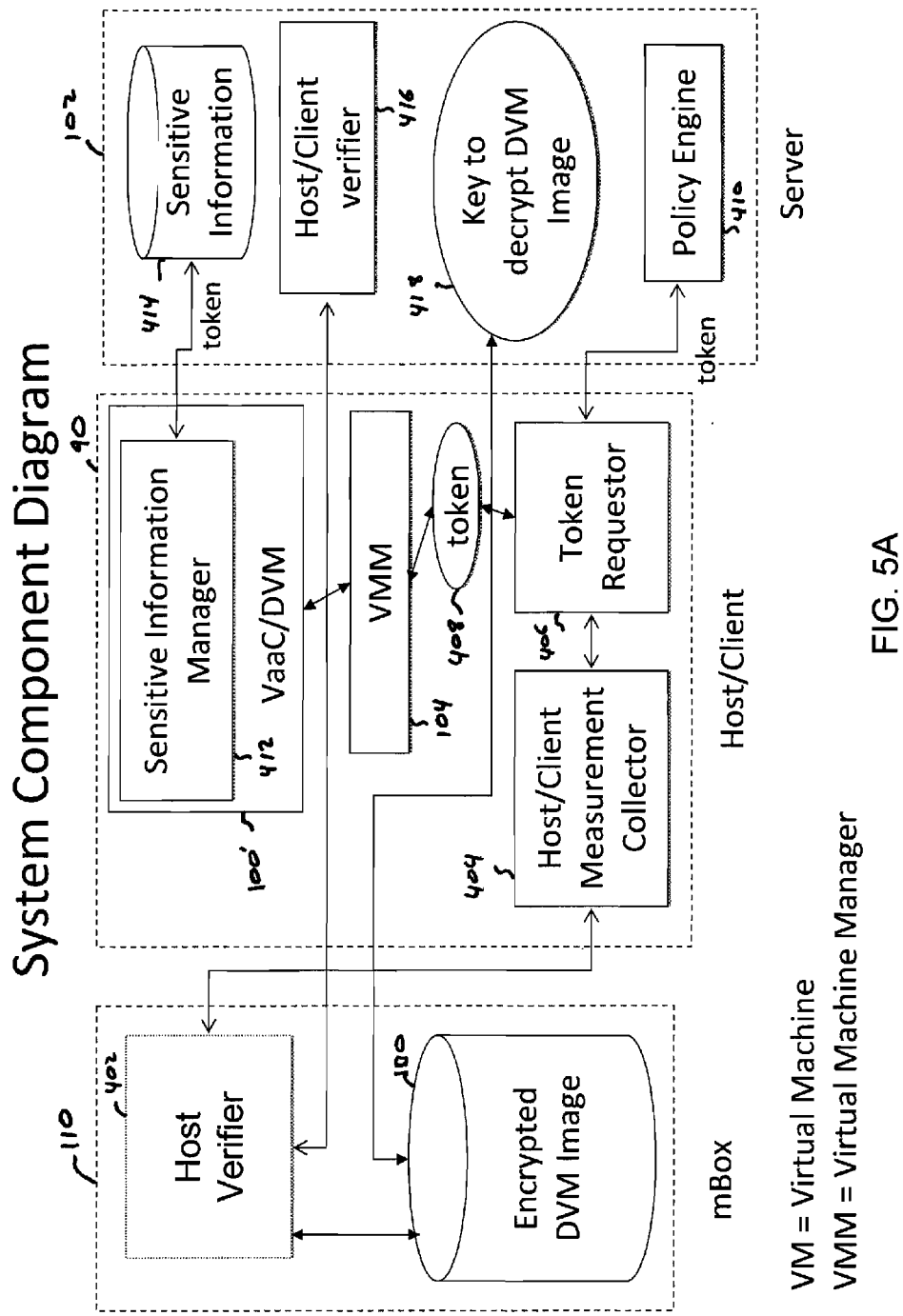
FIG. 5A is a functional block diagram of a computer system conducting a transaction with a service provider using Trusted VaaC mode, according to an embodiment.

FIG. 5A is a functional block diagram of a computer system conducting a transaction with a service provider using Trusted VaaC mode, according to an embodiment. In FIG. 5A, an mBox 110, a Host/Client 90 and a server 102 are in wire and/or wireless data communication. The mBox 110, the host/client 90 and the server 102 are computers storing programs (software) and/or computing hardware that control the computer to execute operations according to the invention. In FIG. 5A, the mBox 110 includes a host verifier 402 (e.g., a program running host verification). Further, the mBox 110 includes an encrypted dedicated DVMI 100. The host/client 90 includes an installed (executing or launching) VaaC/DVM 100', a VMM 104, a host measurement collector 404, and a token requester 406. A server of the service provider 102 includes sensitive information 414, client verifier 416, and a policy engine/rules 410.

FIG. 5B is a flow chart of conducting a transaction with a service provider using Trusted VaaC mode in the computer system of FIG. 5A. In case the mBox 110 is communicably connectable to the host/client 90 via a Universal Serial Port (USB), at 520, the mBox 110 is plugged to the host/client 90. At 521, host verifier 402, namely a "Program to run host verification," starts, and contacts Host Measurement Collector 404 to get the host measurement (i.e., installed software, running software, etc.). At 522, the host verifier 402 sends the measurement to server 102, namely, at 523, a host/client verification engine 416 will verify whether the host 90 is valid. If, at 524, host/client 90 verification fails, nothing will happen, or the process is stopped. If, at 525, verification succeeds, the server 102 sends a key 418 to mBox 110 for decrypting the DVMI 100. At 526, mBox 110 uses the key 418 to unlock the encrypted DVMI 100.

At 527, the token requestor 406 requests a token 408 from server 102, and also the measurement of host/client 90 and/or mBox 110 will be collected and sent to server 102. At 528, the policy engine 410 will determine whether to issue a token 408 based on the measurement information sent from the host/client 90. At 529, if a token 408 is issued, the token will be sent back to host/client 90, thereby establishing a Trusted VaaC/Trusted DVM 100". At 530, the host/client 90 launches the Trusted VaaC/TDVM 100" above VMM 104 using the DVMI 100 in mBox 110. The DVM 100' launch operations are similar to DVM 100' launch operations 427. At 531, the token 408 is sent to a Sensitive Information Viewer 412 in TDVM 100". The Sensitive Information manager 412 uses the token 408 to access (e.g., manage, view, retrieve, edit, etc.) sensitive information 414 in server 102. At 533, after the work (transaction with service provider 102) is done, TDVM 100" is closed, all changes of TDVM 100" are discarded, and at 534, the mBox 110 can be unplugged.

According to an aspect of an embodiment, in FIGS. 4-5, (1) the host/client 90 provides the host/client 90 measurement to mBox 110 for verification by the mBox 110, and (2) the host/client 90 provides the host/client 90 and/or the mBox 110 measurement to the server 102 for verification by the server 102.

The important aspect of Trusted VaaC/TDVM is that extending the trust boundary of the service provider into the end-user's hardware and/or software environment including biometric sensors in a cost-efficient manner through certifiable reporting of who, what, and its environment from client devices. The service provider can KNOW over the network who is using what device with what kind of hardware/software environment on it and that the VMM and VM are unchanged from their known states. Armed with this certifiable knowledge, the service provider can comfortably let the end-user access sensitive data or do financial transactions. In case of a financial institution, it is like having an ATM at the end-user's location and an executing Trusted VaaC/TDVM can be referred to as TDVM mode. However, the embodiments of the invention are not limited the applications of Trusted VaaC to financial domain, but also include other areas such as medical and military domains. This particular combination of specific-purpose VMs and Trusted Computing in Trusted VaaC leads to (including, but not limited to) the following merits:

1. Cost-efficiency due to multiuse nature of the single device for Trusted VaaCs and general-purpose OSs, namely transforming a device into one or more targeted devices each trusted by corresponding service providers.

2. Faster start and easy handling and delivery (over network or from mBox) of Trusted VaaCs due to its relatively small size. For example, mBox 110 with the same memory capacity can fit more DVMIs for establishing one or more independent TDVMs.

3. Less vulnerability and easy development, tests, and deployment due to possible restrictions on VM, OS, applications, Web browsers.

4. Fewer burdens on the host/client devices 90, network, and service provider systems 102 through faster measuring and smaller reports (especially when files are used for virtual hard disk drives and/or memory images).

5. Privacy by (1) keeping user's biometric data local and protected, (2) protect biometric authentication process, and (3) certifiable reporting of who to the service provider through TPM's 607 sealing of measuring a particular state of hardware and/or software configuration of the end-user's device, including sealing of encryption keys, and reporting the same.

Regarding keeping the user biometric data local, according to an aspect of an embodiment a biometrics based user authentication DVM 100' as an instance of a TDVM 100" is provided. The only function the authentication TDVM 100" has is to verify a user's identity, for example, by using biometric technologies. A benefit is that if the TDVM 100" can be trusted, the authentication result can be trusted too. A benefit of using TDVM 100" instead of doing authentication on a server 102 is that the server 102 does not have to store the reference data, thus user's privacy is protected. Further, one way to indicate a successful authentication to the server 102 is to unlock a user's identity key in the TPM 607 from TDVM 100" upon a successful authentication and use that unlocked key to sign and submit certain data to the server 102. If the server 102 can verify the correctness of the signature, the server will understand that the user's identity is correctly authenticated.

Further, according to an aspect of the embodiments, any combinations of the described features, functions and/or operations, including benefits thereof, can be provided and/or achieved. The embodiments can be implemented as an apparatus (a machine) that includes computing hardware (i.e., a computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The described processes can be implemented by programming a computer to execute/process the processes and/or data structures described herein to provide a specific machine, namely to transform a general purpose machine into a specific purpose machine. In particular, the processes when executed by the computer transform the mbox 110, the host/client 90, and service provider 102 as one or more articles into a trusted computing environment as described for accessing and/or conducting transactions/services according to a trust level of the trusted computing environment as a different state or thing of the articles.

Figure 6:
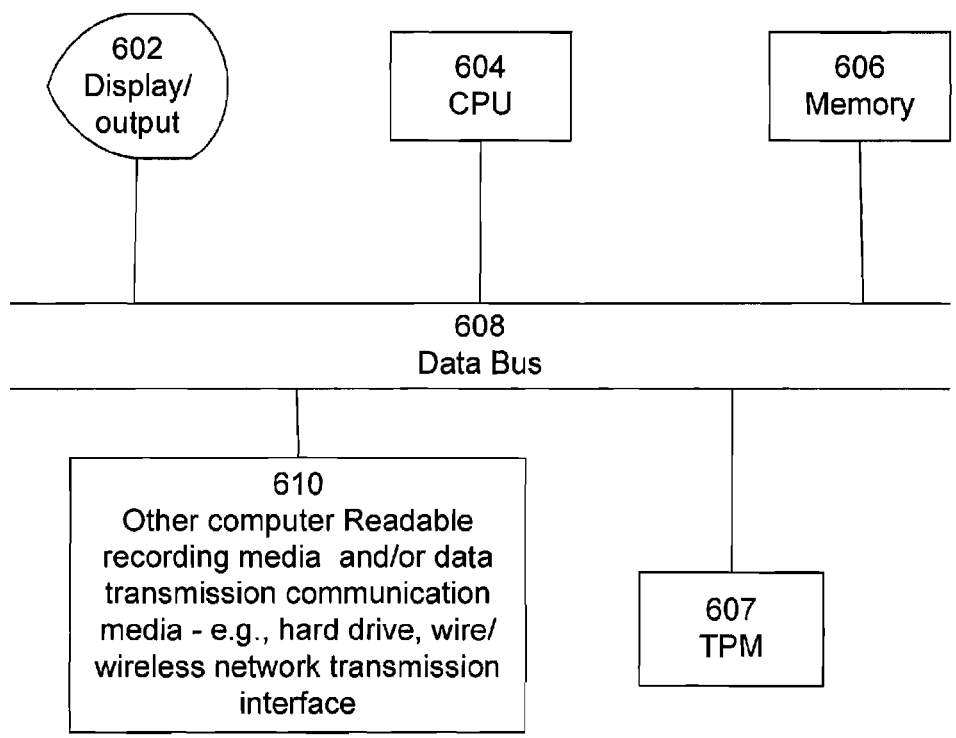
FIG. 6 is a functional block diagram of a computer for the embodiments of the present invention.

FIG. 6 is a functional block diagram of a computer for the embodiments of the invention. In FIG. 6, the computer can be any computing device. Typically, the computer includes a display or output unit 602 to display a user interface or output information or indications to output devices, such as a diode, speaker, printer, etc. A controller 604, which typically is a hardware logic circuitry based computer processor that processes or executes instructions, namely software/program (e.g., a central processing unit). Typically, a memory 606 stores the instructions for execution by the controller 604. A Trusted Platform Module 607 can be provided. According to an aspect of an embodiment, the apparatus reads/processes any computer readable recording media and/or electronic data transmission communication media 610. The display 602, the CPU 604, the memory 606 and the computer readable media 610 are in communication by the data bus 608. Any results produced can be displayed on a display of the computing hardware. A program/software implementing the embodiments may be recorded and/or embodied on computer readable media comprising computer-readable recording media and transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The program/software implementing the embodiments may also be transmitted over a transmission communication media, and examples of transmission communication media include a carrier-wave signal, an optical signal, etc.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope thereof.

What is claimed is:

1. A trusted computing method, comprising:
generating a dedicated virtual machine image (DVMI) including an application for a target service provider and only operating system (OS) functionality for the application of the target service provider, and reducing OS file system usage of the application for the target service provider by using a memory image and/or a file system image of files to transact with the target service provider;
storing the DVMI in a portable computing device;
responsive to a communicable connection by the portable computing device to a host device, executing a process of:
verifying the host device by:
executing a host verifier on the portable computing device,
retrieving by the host verifier a host measurement from the host device,
transmitting the host measurement to a server of the target service provider,
verifying by the target service provider server the host device based upon the host measurement, and
launching the DVMI in the host device as a dedicated virtual machine (DVM) by:
requesting by the host device a token from the target service provider server including transmitting, to the target service provider server, a measurement of both the host device including the DVM and a measurement of the portable computing device,
determining by the target service provider whether to issue a token based on the measurement information sent from the host device, and
launching the DVM upon receipt of the token by the host device, wherein a determination by the target service provider of a trust level for the DVM is based upon the verifying and a level of service provided by the target service provider to the DVM is according to the trust level of the DVM.

2. The method according to claim 1, wherein the verifying of the host device comprises upon accessing a server of the target service provider through the launched DVM, transmitting to the target service provider server a certifiable report of a measurement of the DVMI, the launched DVM, the host device, and the portable computer device.

3. The method according to claim 1, wherein the verifying of the host device comprises:
verifying by the host verifier the host device based upon the host measurement.

4. The method according to claim 1, further comprising discarding all changes to the launched DVM and shutting down the launched DVM after the discarding.

5. The method according to claim 1, wherein the generating of the DVMI comprises performing any combinations of:
limiting functionality of the operating system (OS) of the DVMI to an accessory, a peripheral, or an add-in for a Web browser, or any combinations thereof, as required for the target service provider,
limiting access to certificate stores of the OS, the application and/or the Web browser,
restricting a number of IP addresses or DNS names the DVM accesses to the service provider,
applying a high protection-level setting for the OS, the application, and/or the Web browser, or
limiting OS and/or application modification and/or navigation authority of a user.

6. The method according to claim 1, wherein
the storing of the DVMI in the portable computing device comprises encrypting the DVMI with a key, and
the launching of the DVMI in the host device comprises retrieving the key for decrypting the DVMI, from the portable computing device and/or from another server.

7. The method according claim 6, wherein the key is sealed in the portable computing device by a Trusted Platform Module.

8. The method according to claim 1, wherein measuring of the launched DVM is a white list based measurement and/or Hash based measurement.

9. The method according to claim 1,
wherein the storing of the DVMI in the portable computing device comprises securing the DVMI;
wherein the verifying of the host device comprises:
verifying by the host verifier the host device based upon the host measurement, and
unlocking the secured DVMI according to a successful result of the verifying of the host device; and
wherein accessing the target service provider server comprises any combination of transmitting a certifiable report or the token.

10. The method according to claim 9, wherein the DVMI is secured by encrypting the DVMI with a key and/or by a Trusted Platform Module.

11. The method according to claim 1,
wherein the storing of the DVMI in the portable computing device comprises securing the DVMI with a Trusted Platform Module;
wherein the verifying of the host device comprises:
transmitting by the target service provider server a key to the portable computing device, according to a successful result of the verifying of the host device, and
unlocking by the portable computing device the secured DVMI using the key and launching the DVMI in the host device; and wherein accessing the target service provider server comprises any combination of transmitting a certifiable report or the token.

12. The method according to claim 1,
wherein the measurement of the DVMI comprises:
    designating the launched DVMI as read-only and
    before launching the DVMI, calculating a hash value of the DVMI, and
    verifying integrity of the DVMI by comparing the calculated DVMI hash value with a another hash value for the DVMI; and
wherein the measurement of the launched DVM comprises:
    selecting one or more files of the launched DVM,
    calculating a hash value of the selected files of the launched DVM, and
    verifying integrity of the launched DVM by comparing the calculated selected files hash value with another hash value for the selected files.

13. A trusted computing transaction method, comprising:
generating a dedicated virtual machine image (DVMI) including an application for a target service provider and only operating system (OS) functionality for the application of the target service provider, and reducing OS file system usage of the application for the target service provider by using a memory image and/or a file system image of files to transact with the target service provider;
launching by a portable computing device the DVMI in a host device as a Trusted Dedicated Virtual Machine (TDVM) by:
    requesting by the host device a token from a target service provider server including transmitting a measurement of both the DVMI and the portable computing device, to the target service provider server;
    determining by the target service provider whether to issue a token based on the measurement information sent from the host device;
    upon receipt of the token by the host device, launching the DVMI as the TDVM, and
    determining by the target service provider a trust level for the TDVM, based upon the measurement information sent from the host device; and
    providing a level of service by the target service provider server to the TDVM, according to the trust level of the TDVM.

14. The method according to claim 13, wherein the TDVM is a trusted authenticator verifying a user identity according to information and/or biometric technologies.

15. A computer system for accessing a server of a target service provider, comprising:
    a host device; and
    a portable computing device capable of communication with the host device, the portable computing device storing a dedicated virtual machine image (DVMI) including an application for the target service provider and only operating system (OS) functionality for the application of the target service provider, and memory image and/or a file system image of files to transact with the target service provider to reduce OS file system usage of the application for the target service provider,
wherein the host device and/or the portable computing device comprise a computer processor executing:
    verifying the host device, the verifying including a measurement of the DVMI, and
    controlling launching of the DVMI by the host device as a Trusted Dedicated Virtual Machine (TDVM) by:
        requesting by the host device a token from the target service provider server including transmitting a measurement of both the host device, including the DVMI, and a measurement of the portable computing device, to the target service provider server;
        determining by the target service provider whether to issue a token based on the measurement information sent from the host device;
        upon receipt of the token by the host device, launching the DVMI as the TDVM,
    a determination by the target service provider of a trust level for the TDVM is based upon the measurement information sent from the host device and a level of service provided by the target service provider to the TDVM is according to the trust level of the TDVM.

16. The computer system according to claim 15, wherein the portable computing device verifies the host device by:
    executing a host verifier on the portable computing device,
    retrieving by the host verifier a host measurement from the host device, and
    verifying by the host verifier the host device based upon the host measurement.

17. The computer system according to claim 15, wherein the portable computing device stores the DVMI by performing any combinations of:
    limiting functionality of the operating system (OS) of the DVMI to an accessory, a peripheral, or an add-in for a Web browser, or any combinations thereof, as required for the target service provider,
    limiting access to certificate stores of the OS, the application and/or the Web browser,
    restricting a number of IP addresses or DNS names the DVM accesses to the service provider,
    applying a high protection-level setting for the OS, the application, and/or the Web browser, or
    limiting OS and/or application modification and/or navigation authority of a user.

18. The computer system according to claim 15,
wherein the portable computing device comprises security securing the DVMI;
wherein the portable computing device verifies the host device by:
    executing a host verifier on the portable computing device,
    retrieving by the host verifier a host measurement from the host device,
    verifying by the host verifier the host device based upon the host measurement, and
    unlocking the secured DVMI according to a successful result of the verifying of the host device and launching the DVMI in the host device.

* * * * *

UNITED STATES PATENT AND TRADEMARK OFFICE
CERTIFICATE OF CORRECTION

| | | |
|---|---|---|
| PATENT NO. | : 8,539,551 B2 | Page 1 of 1 |
| APPLICATION NO. | : 12/326676 | |
| DATED | : September 17, 2013 | |
| INVENTOR(S) | : Ryusuke Masuoka et al. | |

It is certified that error appears in the above-identified patent and that said Letters Patent is hereby corrected as shown below:

In the Claims:
In Column 16, Line 37, In Claim 7, after "according" insert -- to --.
In Column 16, Line 42, In Claim 8, delete "Hash" and insert -- hash --, therefor.
In Column 17, Line 57, In Claim 15, after "and" insert -- a --.

Signed and Sealed this
Eighteenth Day of February, 2014

Michelle K. Lee
*Deputy Director of the United States Patent and Trademark Office*